(12) United States Patent
MacDonald et al.

(10) Patent No.: US 6,264,238 B1
(45) Date of Patent: Jul. 24, 2001

(54) REACTIVE SURFACE RIB CARTRIDGE COUNTERMEASURE FOR VEHICLE INTERIOR HARD TRIM APPLICATIONS

(75) Inventors: Stewart M. MacDonald, Holly; Steven R. Swailes, Metamora; Dragi Jovan, Commerce; Kenneth J. Okray, Shelby Township, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/407,676

(22) Filed: Sep. 28, 1999

(51) Int. Cl.⁷ .................................................. B60R 21/04
(52) U.S. Cl. ........................................... 280/751; 296/189
(58) Field of Search ................................. 280/751, 748; 296/189, 188, 210, 214

(56) References Cited

U.S. PATENT DOCUMENTS

| 3,930,665 | * | 1/1976 | Ikawa ................................... 280/751 |
| 3,938,404 | | 2/1976 | Murase et al. . |
| 3,945,662 | | 3/1976 | Murase et al. . |
| 3,948,539 | | 4/1976 | Murase et al. . |
| 4,006,947 | | 2/1977 | Oonuma et al. . |
| 4,119,749 | | 10/1978 | Roth et al. . |
| 4,131,702 | | 12/1978 | Alfter et al. . |
| 4,194,762 | | 3/1980 | Sudo . |
| 4,212,954 | | 7/1980 | Nomura et al. . |
| 4,255,986 | | 3/1981 | Mukoyama . |
| 4,263,356 | | 4/1981 | Nomura et al. . |
| 4,411,103 | | 10/1983 | Ohmura et al. . |
| 4,479,992 | | 10/1984 | Häeseker et al. . |
| 4,648,164 | | 3/1987 | Hyodo et al. . |
| 4,718,296 | | 1/1988 | Hyodo . |
| 4,886,696 | | 12/1989 | Bainbridge . |
| 4,957,797 | | 9/1990 | Maeda et al. . |
| 5,098,124 | | 3/1992 | Breed et al. . |
| 5,141,279 | | 8/1992 | Weller . |
| 5,273,314 | | 12/1993 | Sakakibara . |
| 5,290,622 | | 3/1994 | Tanabe . |
| 5,306,066 | | 4/1994 | Saathoff . |
| 5,314,229 | | 5/1994 | Matuzawa et al. . |
| 5,326,615 | | 7/1994 | Tsuchihashi et al. . |
| 5,356,177 | | 10/1994 | Weller . |
| 5,433,478 | | 7/1995 | Naruse . |
| 5,573,272 | * | 11/1996 | Teshima ................................ 280/751 |
| 5,575,500 | | 11/1996 | Mimura et al. . |
| 5,609,385 | * | 3/1997 | Daniel et al. ........................ 296/188 |
| 5,649,721 | | 7/1997 | Stafford et al. . |
| 5,660,426 | | 8/1997 | Sugimori et al. . |
| 5,709,407 | | 1/1998 | Stephens et al. . |
| 5,749,193 | | 5/1998 | Bucher . |
| 5,749,600 | | 5/1998 | Yamada et al. . |
| 5,762,392 | | 6/1998 | Suga . |
| 5,800,008 | | 9/1998 | Gondo . |
| 5,806,889 | * | 9/1998 | Suzuki et al. ........................ 280/748 |
| 5,823,611 | | 10/1998 | Daniel et al. . |
| 5,836,641 | | 11/1998 | Sugamoto et al. . |
| 5,851,626 | | 12/1998 | McCorry et al. . |
| 5,853,843 | | 12/1998 | Patel et al. . |
| 5,857,702 | | 1/1999 | Suga et al. . |
| 5,857,734 | | 1/1999 | Okamura et al. . |

(List continued on next page.)

Primary Examiner—Kenneth R. Rice
Assistant Examiner—Lynda Jasmin
(74) Attorney, Agent, or Firm—Mark P. Calcaterra

(57) ABSTRACT

The present invention provides a reactive countermeasure for use in an interior compartment of a vehicle which has a reactive surface rib cartridge. The reactive surface rib cartridge comprises a uniform reactive surface constructed as one piece of material and has a plurality of ribs attached to and extending perpendicularly from the uniform reactive surface. Each of the plurality of ribs has a contact surface distally located from the uniform reactive surface and is tuned to manage impact energy from a FMH at a rate of fifteen MPH.

16 Claims, 3 Drawing Sheets

U.S. PATENT DOCUMENTS

| | | |
|---|---|---|
| 5,884,962 | 3/1999 | Mattingly et al. . |
| 5,938,273 | 8/1999 | Williams et al. . |
| 5,992,924 * | 11/1999 | Noritake et al. ...................... 296/189 |
| 6,036,227 * | 3/2000 | Lin et al. .............................. 280/751 |
| 6,049,952 * | 4/2000 | Mihelich et al. .................... 296/189 |
| 6,059,342 * | 5/2000 | Kawai et al. ......................... 296/189 |
| 6,068,320 * | 5/2000 | Miyano ................................. 296/189 |
| 6,073,992 * | 6/2000 | Yamauchi et al. ................... 296/188 |
| 6,126,231 * | 10/2000 | Suzuki et al. ........................ 296/189 |

* cited by examiner

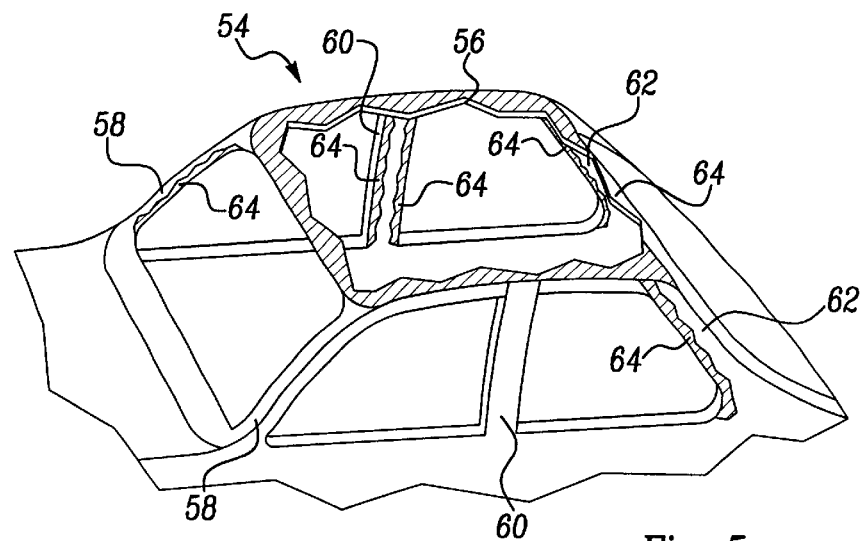
*Fig-5*
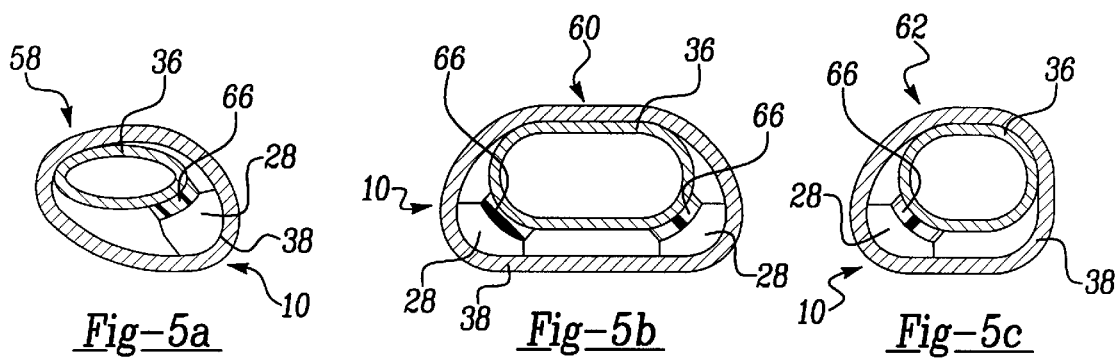
*Fig-5a*  *Fig-5b*  *Fig-5c*
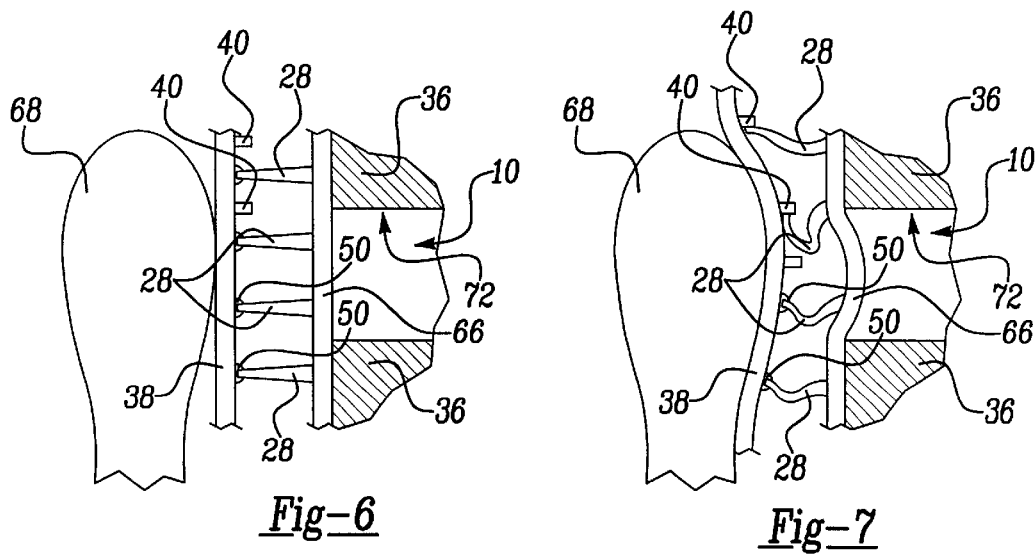
*Fig-6*  *Fig-7*

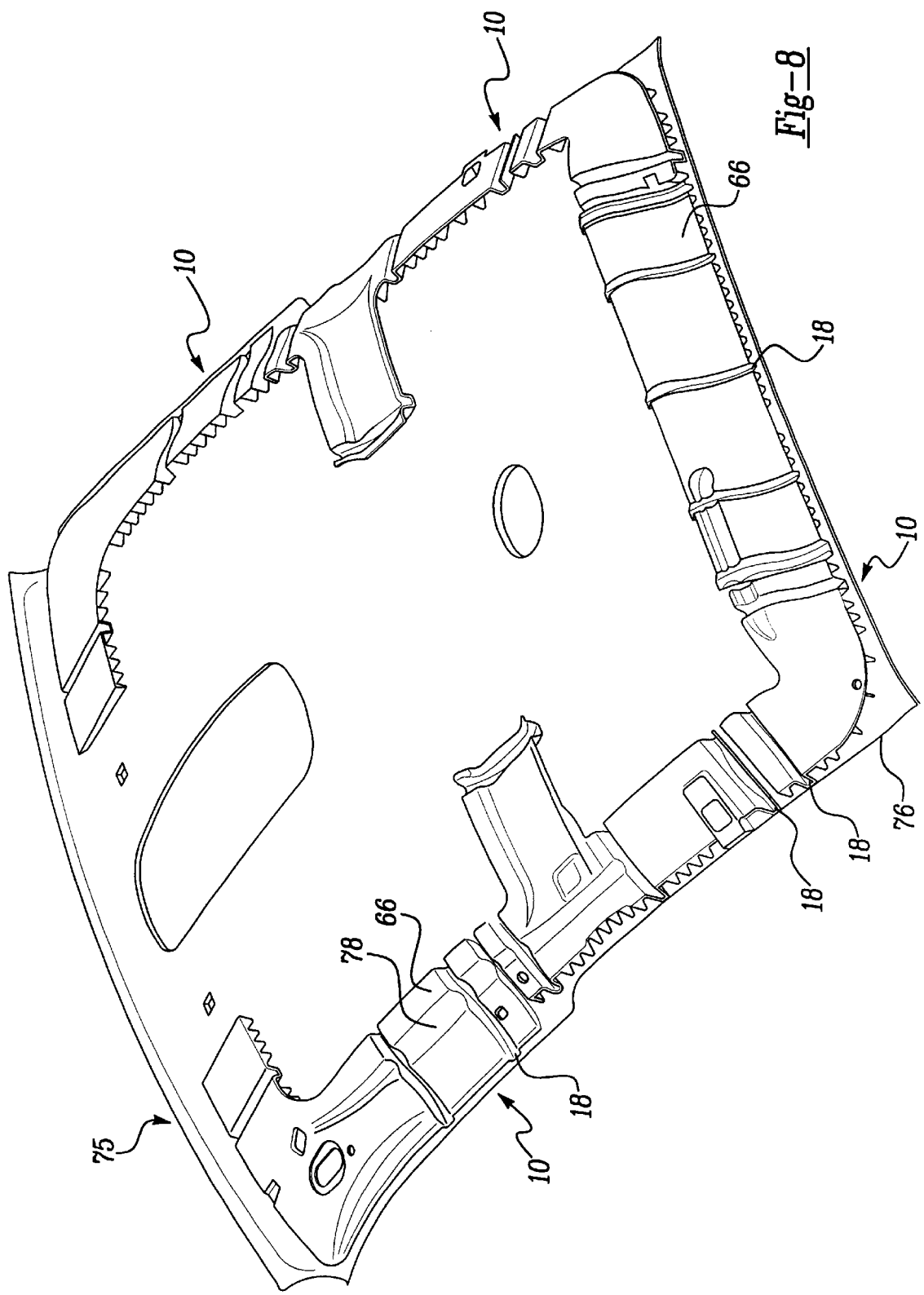

US 6,264,238 B1

REACTIVE SURFACE RIB CARTRIDGE COUNTERMEASURE FOR VEHICLE INTERIOR HARD TRIM APPLICATIONS

FIELD OF THE INVENTION

The present invention relates to a reactive countermeasure for use in a vehicle, and more particularly, to a reactive countermeasure for use on discontinuous surfaces which are associated with vehicle hard trim.

BACKGROUND OF THE INVENTION

Currently, automobiles and other vehicles are equipped with safety devices designed to protect the vehicle driver and passengers from injury in the event that the vehicle undergoes a crash. Such equipment includes impact absorbing material mounted to the interior of the passenger compartment of the vehicle. This impact absorbing material is positioned around the A-pillar, B-pillar, rear pillar and roof panel of the vehicle and is designed to absorb the impact of a vehicle occupant's head during a vehicle crash. The Federal Government has set specific requirements on the allowable impact energy which this equipment must be designed to absorb.

While this equipment has provided adequate impact absorption when positioned on planar surfaces, it has failed to address a variety of positioning concerns particularly with respect to being mounted on discontinuous surfaces such as that associated with weld access holes, lap joints or uneven surfaces. Specifically, with regard to foam, the equipment lacks structural rigidity and must, instead, rely on a rigid surface for support. As a result, this material is unable to, by itself, bridge discontinuous surfaces and still provide structural support for impact absorption.

In addition, conventional impact absorption equipment is difficult, or impossible, to install onto open and exposed surfaces during assembly. Specifically, with regard to foams, they must be injected into assembled equipment, using the walls of the enclosed space formed by the assembled components for support.

Accordingly, there exists a need in the relevant art to provide impact absorbing equipment which provides for both ease of attachment and the ability to bridge discontinuous surfaces.

SUMMARY OF THE INVENTION

In view of the above, it is an object of the present invention to provide a reactive countermeasure that includes a uniform reactive surface for bridging discontinuities in a surface.

It is a further object of the present invention to provide a reactive countermeasure which has at least one cavity formed in the uniform reactive surface which provides a passage to the mounting surface to allow attachment of the uniform reactive surface to the mounting surface.

In accordance with the broad teachings of this invention, a reactive countermeasure having an advantageous construction and method of assembly is provided. Accordingly, the present invention provides a reactive countermeasure for use in an interior compartment of a vehicle which uses a reactive surface rib cartridge to absorb impact energy. The reactive surface rib cartridge comprises a uniform reactive surface constructed as a one-piece unit which has a plurality of ribs attached to and extending perpendicularly from the uniform reactive surface. Each one of the ribs has a contact surface distally located from the uniform reactive surface and is tuned to manage impact energy from a FMH (free motion head form) at a rate of fifteen MPH.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 5 is a perspective view of a roof section incorporating a reactive surface rib cartridge according to the present invention;

FIG. 5A is a cross-sectional view of a reactive surface rib cartridge in conjunction with an A-pillar according to the present invention;

FIG. 5B is a cross-sectional view of a reactive surface rib cartridge in conjunction with a B-pillar according to the present invention;

FIG. 5C is a cross-sectional view of a reactive surface rib cartridge in conjunction with a rear pillar according to the present invention;

FIG. 6 is a cross-sectional view of a reactive surface rib cartridge according to the present invention;

FIG. 7 is a cross-sectional view of a reactive surface rib cartridge according to the present invention; and FIG. 8 is a perspective view of a reactive surface rib cartridge in conjunction with a roof panel according to the present invention.

DETAILED DESCRIPTION OF THE PREFERRED EMBODIMENTS

The following description of the preferred embodiments is merely exemplary in nature and is in no way intended to limit the invention, its application, or uses.

Figure 1:
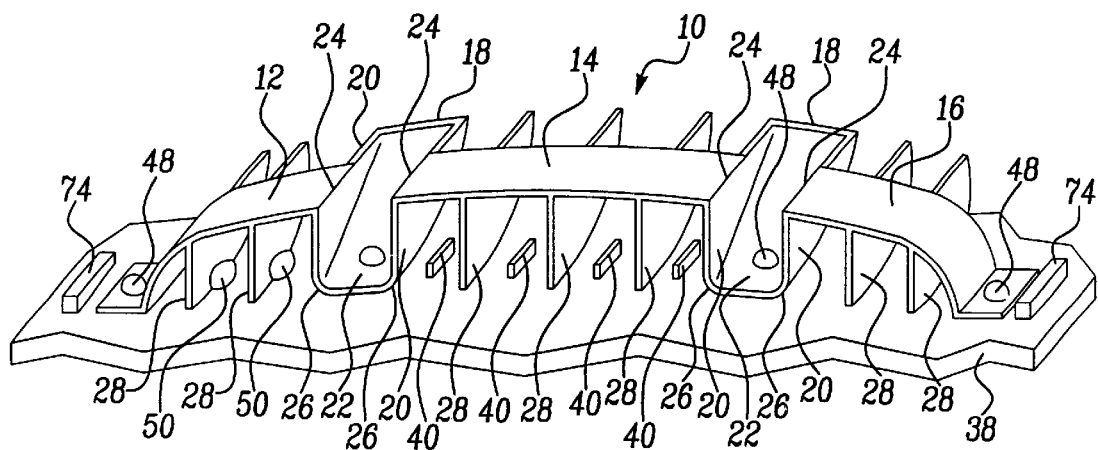
FIG. 1 is a perspective view of a reactive surface rib cartridge according to the present invention.

Referring now to FIG. 1, a reactive surface rib cartridge 10 is shown and described. Specifically, FIG. 1 illustrates a reactive surface rib cartridge 10 generally including a plurality of uniform reactive surfaces 12, 14 and 16 which are joined together by cavities 18. Each uniform reactive surface 12, 14, and 16 is constructed as a one-piece integrally formed member as shown, not a series of connected elements. As such, there are no discontinuities along uniform reactive surfaces 12, 14 and 16 which would create a shear plane under load (as will be discussed). Each uniform reactive surface 12, 14 and 16 preferably includes a plurality of cavities 18 for attaching reactive surface rib cartridge 10 to a cover material 38. Each cavity is bounded by side walls 20 and bottom portion 22. Each side wall 20 is joined to respective reactive surfaces 12, 14 and 16 at upper area 24 and joined to respective bottom portions 22 at lower areas 26. However, it should be appreciated that the illustrated configurations of cavities 18, as well as their inclusion in the present embodiment altogether, may be modified from that illustrated and described herein without departing from the scope of the claimed invention defined by the appended claims. More particularly, it is contemplated that cavities 18 may be optionally used for mounting the reactive surface rib cartridge 10 as is necessary in conjunction with the present invention.

Figure 2:
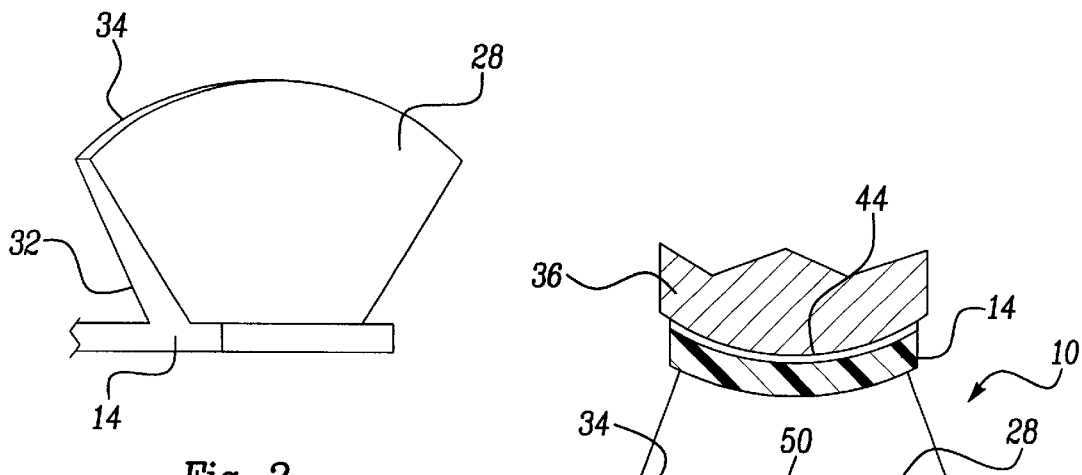
FIG. 2 is a perspective view of one rib of a reactive surface rib cartridge according to the present invention.

Referring to FIGS. 1 and 2, ribs 28 extend generally perpendicularly from each uniform reactive surface 12, 14, and 16. Ribs 28 are generally equidistantly disposed along uniform reactive surfaces 12, 14 and 16. Furthermore, each rib 28 is preferably similar in shape as the remainder of ribs 28 and extends a similar length from uniform reactive surfaces 12, 14, and 16. Each rib 28 begins at a relatively thick base portion 32 and extends away from uniform reactive surfaces 12, 14 and 16 to a relatively thinner contact surface 34, as best shown in FIG. 2. As a result, each rib 28 has a tapered triangular-like shape which offers a number of advantages. First, this triangular shape allows uniform reactive surfaces 12, 14 and 16 and accompanying ribs 28, if formed by a molding process, to be easily removed from a mold. Second, the triangular shape offers increased strength along each rib 28 when under compression. Moreover, ribs 28 are collectively tuned to absorb the impact from a free motion head form at a rate of 15 MPH (as will be discussed). This tuning is accomplished by adjusting the size and shape of each rib 28 or selecting the type of material from which ribs 28 are constructed from to allow ribs 28 to collapse at a predetermined rate under force in order to properly absorb an impact.

Figure 3:
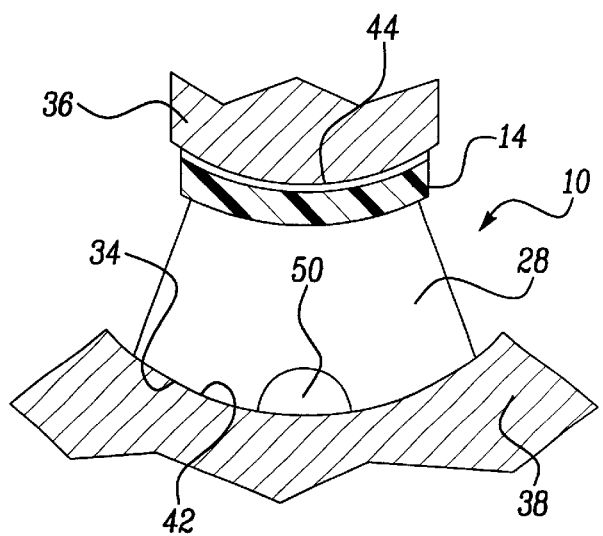
FIG. 3 is a cross-sectional view of a reactive surface rib cartridge according to the present invention.

With continued reference to FIG. 1 and new reference to FIG. 3, reactive surface rib cartridge 10 is shown positioned between impact surface 36 and cover material 38. Impact surface 36 is positioned adjacent uniform reactive surface 12, 14 or 16 and each contact surface 34 is positioned adjacent surface 42 of cover material 38. Cover material 38 preferably has a plurality of protrusions 40 extending upwardly from and positioned equidistantly spaced along a surface of cover material 38. Each protrusion 40 is positioned between two ribs 28. Preferably, contact surface 34 is contoured to physically communicate with surface 42 of cover material 38. This contouring ensures that the maximum surface contact exists between cover material 38 and each rib 28. Likewise, surface 44 of uniform reactive surfaces 12, 14 or 16 is contoured to physically communicate with surface 46 of impact surface 36. Again, this ensures the maximum amount of contact therebetween. Moreover, in this embodiment, uniform reactive surfaces 12, 14 and 16 are concave in configuration. The concave formation of uniform reactive surface 12, 14 and 16 allows it to be positioned adjacent a tubular structure such as an A-pillar, B-pillar or rear pillar. Likewise, the convex configuration of each contact surface 34 allows each rib 28 to be positioned adjacent a cylindrical shell such as a cover to an A-pillar, B-pillar or rear pillar.

Figure 4:
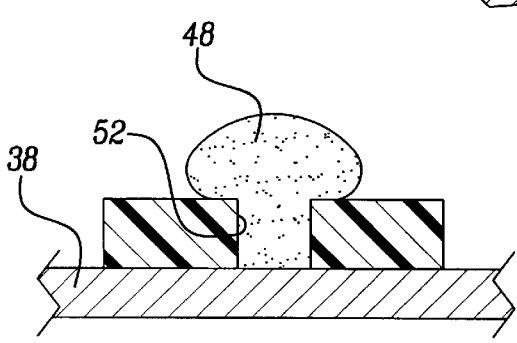
FIG. 4 is a cross-sectional view of a glue spot in a reactive surface rib cartridge according to the present invention.

In a preferred embodiment of the present invention, reactive surface rib cartridge 10 is attached to cover portion 38 by glue spots 48 and 50. As illustrated in FIG. 1, each end of reactive surface rib cartridge 10 has a flattened portion which has an aperture 52 therein for attachment by a glue spot 48 (see FIG. 4). Glue spots 48 communicate through aperture 52 with surface 42 of cover material 38 to attach reactive surface rib cartridge 10 to cover portion 38. Likewise, each cavity 18 has an aperture 52 for joining glue spot 48 to cover material 38.

Referring now to FIG. 5, vehicle 54 is illustrated and includes roof 56, A-pillars 58, B-pillars 60, and rear pillars 62. The impact surfaces of these elements as well as the remainder of the seating area within the vehicle define the cockpit. When a vehicle, such as vehicle 54, undergoes a crash, the head of a vehicle passenger or driver seated in the vehicle may be rapidly moved about the cockpit of the vehicle, whether the driver or passenger is seatbelted in or not. As a result, the vehicle passenger's head may impact areas 64 of A-pillar 58, B-pillar 60, rear pillar 62, and roof 56. As such, the Federal Government has required these areas to be able to manage impact energy from a FMH (free motion head form) at a rate of fifteen MPH for the federally mandated standard (FMVSS 201). In essence, this requirement necessitates that each impact area 64 must be able to absorb and thus cushion the impact of a mass, similar in size and weight to a vehicle occupant's head, which is travelling at a rate of fifteen MPH.

Referring now to FIGS. 5a, 5b, and 5c, a cross-sectional view of A-pillar 58, B-pillar 60, and rear pillar 62 are shown. Each pillar has a respective impact surface 36, reactive surface rib cartridge 10, and cover material 38. Each reactive surface rib cartridge 10 is positioned under a respective impact area 64 of A-pillars 58, B-pillars 60, and rear pillars 62.

FIG. 8 shows a second embodiment of the present invention having a plurality of reactive surface rib cartridges 10 used in conjunction with a roof 56. Specifically, a roof panel cover 76 is shown reinforced by a plurality of reactive surface rib cartridges 10. Each spot along potential impact areas 64 of roof panel cover 76 is reinforced with a respective reactive surface rib cartridge 10. As such, uniform reactive surfaces 12, 14 or 16 are positioned against an impact surface 36 (typically a roof panel) and each contact surface 34 of ribs 28 are positioned against cover material 38, in this case roof panel cover 76, In this embodiment, however, uniform reactive surface 66 and contact surface 34 are relatively planar. This configuration allows each of these elements to provide impact absorption between the relatively planar roof panel cover 76 and impact surface 36 of roof 56. The planar configuration of uniform reactive surface 66 provides maximum physical contact between it and impact surface 36. Likewise, the planar configuration of contact surface 34 allows maximum contact between it and roof panel cover 76. Each reactive surface rib cartridge 10 is joined to the roof panel cover 76 by glue spots located within cavities 18. As illustrated in FIG. 8, contours 78 are formed on uniform reactive surface 66. These contours 78 provide for protrusions which extend from the impact surface of roof 56, providing maximum physical contact between these protrusions and uniform reactive surface 66. In essence, contours 78 act as the concave formation of uniform reactive surfaces 12, 14 and 16 in the first embodiment, allowing uniform reactive surface 66 to be positioned in contact with varying geometry in a standard roof panel.

Referring now to FIGS. 6 and 7, the operation of the present invention will now be described. In FIGS. 6 and 7, free motion head form 68 travels toward and impacts the cover material 38 which is reinforced by reactive surface rib cartridge 10. The force of impact of free motion head form 68 is transferred from cover material 38, through ribs 28, and finally to uniform reactive surface 12, 14, 16 or 66. Uniform reactive surface 12, 14, 16 or 66, in turn, is supported by impact surface 36 and resists movement from the impact of free motion head form 68. Instead, ribs 28 provide the necessary give to absorb impact of free motion head form 68. As shown in FIG. 7, as free motion head form 68 impacts cover 38, ribs 28 which are not glued by glue spots 50, slide away from cover 38 until intersecting with protrusions 40. Protrusions 40 then cause ribs 28 to bend and fold in an elastic fashion, thereby absorbing the impact of free motion head form 68. Ribs 28 which are attached to cover material 38 by glue spots 50 maintain their position with respect to cover material 38. As such, these ribs 28 immediately bend with the impact of free motion head form 68. Like before, this allows absorption of the impact of free motion head form 68. It is noted that both methods discussed above may be used in conjunction with one-another. For instance, glue spots 50 can be used to attach ribs 28 to cover material 38 and protrusions 40 can be positioned nearby in case glue spots 50 fail. Lastly, breakaway stops 74 (best shown in FIG. 1) maintain the outer edges of uniform reactive surface 12 and 16 from expanding outward beyond breakaway stop 74 in case glue spots 48 fail while free motion head form 68 is impacting cover 38.

In response to the transfer of impact energy from free motion head form 68, uniform reactive surface 12, 14, 16 or 66, which bridges gap 72 and is therefore not supported by impact surface 36, bows inwardly. Because there is no impact surface 36 to provide support for uniform reactive surface 12, 14, 16 or 66 in this area, uniform reactive surface 66, itself, must provide the required support for ribs 28 which are positioned over the top of gap 72. Ribs 28 are then able to absorb impact from free motion head form 68 in the area of the gap 72.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A reactive countermeasure for use in an interior compartment of a vehicle, said reactive countermeasure comprising:
   a reactive surface rib cartridge at least partially encapsulated by a cover material, said reactive surface rib cartridge, comprising:
   a reactive surface constructed as a one-piece unit;
   a plurality of ribs attached to and extending away from said reactive surface, each of said plurality of ribs having a contact surface distally located from said reactive surface, said plurality of ribs tuned to manage impact energy; and
   a plurality of protrusions positioned along said cover portion, each said protrusion being located between a respective pair of ribs, whereby said plurality of protrusions provides support for said ribs when said reactive surface rib cartridge undergoes an impact.

2. A reactive countermeasure as claimed in claim 1, wherein each of said plurality of ribs is generally equidistantly spaced along said reactive surface.

3. A reactive countermeasure as claimed in claim 1, wherein each said rib is shaped substantially similar to a remainder of said plurality of ribs.

4. A reactive countermeasure as claimed in claim 1, wherein each said rib is positioned substantially parallel to a remainder of said plurality.

5. A reactive countermeasure as claimed in claim 1, wherein each said rib extends away from said reactive surface substantially a same distance as a remainder of said plurality of ribs.

6. An reactive countermeasure as claimed in claim 1, further comprising a cavity defined in said reactive surface, said cavity defined by:
   a first side wall and a second side wall, said first side wall and said second side wall being substantially parallel to and shaped substantially similar to each of said plurality of ribs, a top portion of said first and second side walls being connected to said reactive surface; and
   a bottom portion connecting a bottom portion of said first side wall and said second side wall.

7. A reactive countermeasure as claimed in claim 6, wherein said reactive surface rib cartridge is disposed against an impact surface and is at least partially encapsulated by a cover material, said reactive surface rib cartridge positioned between said impact surface and said cover material such that said contact surface of said plurality of ribs and said bottom portion of said cavity are positioned against said cover material.

8. A reactive countermeasure as claimed in claim 7, wherein said bottom portion of said cavity is joined to said cover portion by a bonding material.

9. A reactive countermeasure as claimed in claim 8, wherein said bonding material is glue.

10. A reactive countermeasure as claimed in claim, 9 wherein said cavity has an aperture disposed therein providing communication between said cavity and said cover portion, said glue forming a glue spot within said cavity and joining said cover portion through said aperture.

11. A reactive countermeasure for use in an interior compartment of a vehicle, said reactive countermeasure comprising:
    a reactive surface rib cartridge disposed against an impact surface and at least partially encapsulated by a cover material, said reactive surface rib cartridge comprising:
    a reactive surface constructed as a one-piece unit; and
    a plurality of ribs attached to and extending away from said reactive surface, each of said plurality of ribs having a contact surface distally located from said reactive surface, each said contact surface of said plurality of ribs positioned against said cover material, said plurality of ribs tuned to manage impact energy.

12. A reactive countermeasure as claimed in claim 11, wherein said impact surface is a member of a set, the set consisting of an A-pillar, B-pillar and a rear-pillar.

13. A reactive countermeasure as claimed in claim 11, wherein said impact surface is a roof of said vehicle, said surface rib cartridge being disposed around an outer perimeter area of said roof inside said vehicle.

14. A reactive countermeasure as claimed in claim 11, wherein said contact surface of said plurality of ribs are contoured to physically communicate with said cover material.

15. An reactive countermeasure as claimed in claim 11, wherein said reactive surface is contoured to physically communicate with said impact surface.

16. A vehicle having an interior compartment with at least one cover material spaced from an impact surface, said vehicle comprising:
    a reactive surface rib cartridge positioned between said cover material and said impact surface, said reactive surface rib cartridge including:
    a reactive surface constructed as a one-piece unit, said reactive surface positioned adjacent said impact surface; and
    a plurality of ribs attached to and extending away from said reactive surface, each of said plurality of ribs having a contact surface distally located from said reactive surface, said contact surface positioned adjacent said cover portion, said plurality of ribs tuned to manage impact energy.

* * * * *